US012570172B2

(12) United States Patent
Harshe et al.

(10) Patent No.: US 12,570,172 B2
(45) Date of Patent: Mar. 10, 2026

(54) SYSTEM AND METHOD OF CONNECTED SOFTWARE UPDATES USING GEO-FENCING AND CHARGER CONNECTION DETECTION

(71) Applicant: Cummins Inc., Columbus, IN (US)

(72) Inventors: Omkar A. Harshe, Columbus, IN (US); Martin T. Books, Columbus, IN (US); Jaideep Prasad, Columbus, IN (US); Vivek Shrikrishna Kulkarni, Columbus, IN (US); Shiva K. Sooryavaram, Columbus, IN (US)

(73) Assignee: Cummins Inc., Columbus, IN (US)

( * ) Notice: Subject to any disclaimer, the term of this patent is extended or adjusted under 35 U.S.C. 154(b) by 739 days.

(21) Appl. No.: 17/781,671

(22) PCT Filed: Jan. 23, 2020

(86) PCT No.: PCT/US2020/014718
§ 371 (c)(1),
(2) Date: Jun. 1, 2022

(87) PCT Pub. No.: WO2021/150224
PCT Pub. Date: Jul. 29, 2021

(65) Prior Publication Data
US 2023/0001812 A1 Jan. 5, 2023

(51) Int. Cl.
*B60L 53/30* (2019.01)
*B60L 53/62* (2019.01)
*B60L 53/66* (2019.01)

(52) U.S. Cl.
CPC ............. *B60L 53/305* (2019.02); *B60L 53/62* (2019.02); *B60L 53/66* (2019.02)

(58) Field of Classification Search
CPC ........ B60L 53/305; B60L 53/62; B60L 53/66; B60L 53/14; B60L 53/16; H04L 67/12; H04L 67/34
See application file for complete search history.

(56) References Cited

U.S. PATENT DOCUMENTS

| | | |
|---|---|---|
| 7,162,339 B2 | 1/2007 | Nguyen |
| 9,413,537 B2 | 8/2016 | Oishi |

(Continued)

FOREIGN PATENT DOCUMENTS

| | | |
|---|---|---|
| WO | 2017079301 A1 | 5/2017 |
| WO | 2018082884 A1 | 5/2018 |

OTHER PUBLICATIONS

Supplementary European Search Report and Written Opinion for European Patent Application No. EP20915508.4, filed Jan. 23, 2020, mailed Sep. 19, 2023.

(Continued)

*Primary Examiner* — David V Henze-Gongola
(74) *Attorney, Agent, or Firm* — Faegre Drinker Biddle & Reath LLP

(57) ABSTRACT

The present disclosure provides a system and method for performing an automatic port over process to replace and/or add to calibration data of an electric vehicle with updated calibration data, comprising: downloading the updated calibration data from a remote computing system; determining whether a charging port of the vehicle is connected to a charging station; determining whether a charging event is complete, wherein an energy storage system of the vehicle receives electrical energy from the charging station through the charging port; determining whether the vehicle is located within a predetermined geo-fence location; and performing the automatic port over process in response to (1) the charging port being connected to the charging station, (2) the (Continued)

charging event being complete, and (3) the vehicle being located within a predetermined geo-fence location.

22 Claims, 2 Drawing Sheets

(56) References Cited

U.S. PATENT DOCUMENTS

| | | | | |
|---|---|---|---|---|
| 2012/0007551 A1* | 1/2012 | Song | | B60L 53/24 |
| | | | | 320/109 |
| 2012/0326665 A1* | 12/2012 | Yin | | B60L 53/302 |
| | | | | 429/100 |
| 2015/0128123 A1* | 5/2015 | Eling | | H04W 4/50 |
| | | | | 717/171 |
| 2016/0266886 A1* | 9/2016 | Sarkar | | H04W 4/50 |
| 2017/0259678 A1 | 9/2017 | Cao | | |
| 2017/0337068 A1* | 11/2017 | Maria | | H04W 4/40 |
| 2019/0391800 A1 | 12/2019 | Lin | | |
| 2022/0274626 A1* | 9/2022 | Raudszus | | G06Q 10/00 |

OTHER PUBLICATIONS

International Search Report and Written Opinion for International patent application No. PCT/US2020/014718, filed Jan. 23, 2020, mailed Apr. 23, 2020.

\* cited by examiner

SYSTEM AND METHOD OF CONNECTED SOFTWARE UPDATES USING GEO-FENCING AND CHARGER CONNECTION DETECTION

CROSS-REFERENCE TO RELATED APPLICATIONS

This application claims priority to International Patent Application No. PCT/US2020/014718, filed Jan. 23, 2020, the disclosure of which is hereby expressly incorporated by reference in its entirety.

TECHNICAL FIELD

The present invention relates generally to electric vehicles and more particularly to updating software of electric vehicles without requiring approval of the vehicle operator.

BACKGROUND

Many vehicles, including vehicles powered by internal combustion engines, electrical power, or a combination of both, include one or more control modules that include electronics and software for controlling a plurality of operational aspects of the vehicle (referred to hereinafter as a "system control module" or "SCM"). Occasionally, software and/or data used by the SCM (hereinafter referred to as "calibration data") is identified as including a bug, an outdated customer requirement, inefficient instructions, outdated look-up data, or other outdated software and/or data that may affect performance of the vehicle. When such outdated calibration data is identified, it is desirable to perform a calibration data update or "port over" by transferring or downloading updated calibration data from a remote location to the SCM of the vehicle. However, the normal operation of the SCM is interrupted during a calibration data port over, so the timing of such port overs should be carefully managed.

Conventionally, calibration data port over was only initiated upon receipt by the SCM of an indication that a port over was desired by the vehicle operator, such as a signal provided to the SCM by a physical switch that is manually activated by the operator. In general, the vehicle operator or other customer associated with the vehicle (e.g., the fleet owner, operations director manager, etc.) receives an electronic notification that a calibration update is available and stored, for example, in the cloud. When the operator or customer approves of receiving a calibration update (such as by activating a physical switch), the calibration data port over begins through wireless communications between the cloud and the vehicle SCM wherein data is sent in small packets. For a variety of reasons, however, it is desired to remove the requirement that a port over is initiated by manual input by the vehicle operator/customer.

As indicated above, the normal operation of the SCM is interrupted during a port over, while certain functions of the vehicle may still be in operation. Thus, in conventional internal combustion engine powered vehicles, a port over would not occur unless the manual request is provided and the engine speed was zero and the vehicle speed was zero. If these criteria were met, the vehicle was considered not in mission and the port over could occur.

For electric vehicles (e.g., all-electric and hybrid vehicles), the energy storage systems (e.g., batteries) may still be functioning even when the vehicle and engine speeds are zero. In other words, the energy storage systems may be powering accessories such as lights and air conditioning while the vehicle is stationary, and interruption of those functions by a calibration data port over would be undesirable. Thus, there is a need for a calibration data port over system and method that does not require manual initiation and does not interfere with the desired operational state of the vehicle.

SUMMARY

In one embodiment, the present disclosure provides a system for automatically performing a calibration data port over process for a vehicle, comprising: a system control module mounted to the vehicle and in communication with an information storage device configured to store calibration data; a telematics module mounted to the vehicle and in communication with the system control module; the telematics module being configured to communicate wirelessly with a remote communication device to receive data indicating a current geographic location of the vehicle and with a remote computing system to receive calibration data; and a charging port mounted to the vehicle and configured to connect to a charging station to receive electrical energy during a charging event for charging an energy storage system mounted to the vehicle; wherein the remote computing system is configured to generate and transmit updated calibration data to the telematics module for use in a port over process to replace and/or add to the calibration data stored on the information storage device; and wherein the system control module is configured to receive the updated calibration data from the telematics module and initiate an automatic port over process to replace and/or add to the calibration data stored on the information storage device with the updated calibration data in response to determining (1) that the charging port is connected to the charging station, (2) that the charging event is complete, and (3) that the current geographic location of the vehicle is within a predetermined geo-fence location. In one aspect of this embodiment, the remote computing system is in communication with the telematics module via a network. In another aspect, the system control module is configured to determine whether a vehicle start switch is in an ON position, and to prevent the automatic port over process in response to the vehicle start switch being in the ON position. In still another aspect, the system control module determines that the charging port is connected to the charging station by receiving a signal from a sensor configured to detect a connection between the charging port and the charging station. In yet another aspect of this embodiment, the system control module determines that the charging event is complete by monitoring a state-of-charge of the energy storage system. In a variant of this aspect, the system control module determines that the charging event is complete when the state-of-charge of the energy storage system equals or exceeds a predetermined threshold. In another aspect, the system control module determines that the current geographic location of the vehicle is within a predetermined geo-fence location by comparing the current geographic location of the vehicle to data stored in the information storage device indicating one or more predetermined geographic locations defined as being safe locations for an automatic port over process. In still another aspect, the system control module determines that the current geographic location of the vehicle is within a predetermined geo-fence location by receiving an indication from the telematics module that the vehicle is in a predetermined geo-fence location. In a variant of this aspect, the one or more predetermined geo-fence locations are defined by an end customer of the vehicle.

In another embodiment, the present disclosure provides an electric vehicle, comprising: a system control module; an information storage device configured to store calibration data used by the system control module during operation of the vehicle; a rechargeable energy storage system including a plurality of battery packs configured to provide power to components of the vehicle; a charging port configured to connect to a charging station to receive electrical energy to charge the energy storage system during a charging event; wherein the system control module is configured to receive calibration data updates from a remote computing system over a network and to initiate an automatic port over process to replace and/or add to calibration data stored on the information storage device with the calibration data updates in response to determining (1) that the charging port is connected to the charging station, (2) that the charging event is complete, and (3) that a current geographic location of the vehicle is within a predetermined geo-fence location. One aspect of this embodiment further comprises a telematics module in communication with the system control module and configured to communicate wirelessly with a remote communication device to receive data indicating the current geographic location of the vehicle and with the remote computing system to receive the calibration data updates. In another aspect, the system control module is configured to determine whether a vehicle start switch is in an ON position, and to prevent the automatic port over process in response to the vehicle start switch being in the ON position. In another aspect, the system control module determines that the charging port is connected to the charging station by receiving a signal from a sensor configured to detect a connection between the charging port and the charging station. In still another aspect of this embodiment, the system control module determines that the charging event is complete by monitoring a state-of-charge of the energy storage system. In a variant of this aspect, the system control module determines that the charging event is complete when the state-of-charge of the energy storage system equals or exceeds a predetermined threshold. In another aspect, the system control module determines that the current geographic location of the vehicle is within a predetermined geo-fence location by comparing the current geographic location of the vehicle to data stored in the information storage device indicating one or more predetermined geographic locations defined as being safe locations for an automatic port over process. In another variation of this aspect, the system control module determines that the current geographic location of the vehicle is within a predetermined geo-fence location by receiving an indication from the telematics module that the vehicle is in a predetermined geo-fence location.

In still another embodiment, the present disclosure provides a method for performing an automatic port over process to replace and/or add to calibration data of an electric vehicle with updated calibration data, comprising: downloading the updated calibration data from a remote computing system; determining whether a charging port of the vehicle is connected to a charging station; determining whether a charging event is complete, wherein an energy storage system of the vehicle receives electrical energy from the charging station through the charging port; determining whether the vehicle is located within a predetermined geo-fence location; and performing the automatic port over process in response to (1) the charging port being connected to the charging station, (2) the charging event being complete, and (3) the vehicle being located within a predetermined geo-fence location. In one aspect of this embodiment, determining whether the charging port is connected to the charging station includes receiving a signal from a sensor configured to detect connection between the charging port and the charging station. In another aspect, determining whether the charging event is complete includes monitoring a state-of-charge of the energy storage system and determining that the charging event is complete when the state-of-charge exceeds a threshold state-of-charge. In still another aspect, determining whether the vehicle is located within a predetermined geo-fence location includes communicating with a remote communication device to receive data indicating a current geographic location of the vehicle and comparing the current geographic location to data stored in an information storage device of the vehicle indicating one or more predetermined geographic locations defined as being safe locations for an automatic port over process. Yet another aspect of this embodiment further comprises determining whether a vehicle start switch is in an ON position, and preventing the automatic port over process in response to the vehicle start switch being in the ON position.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
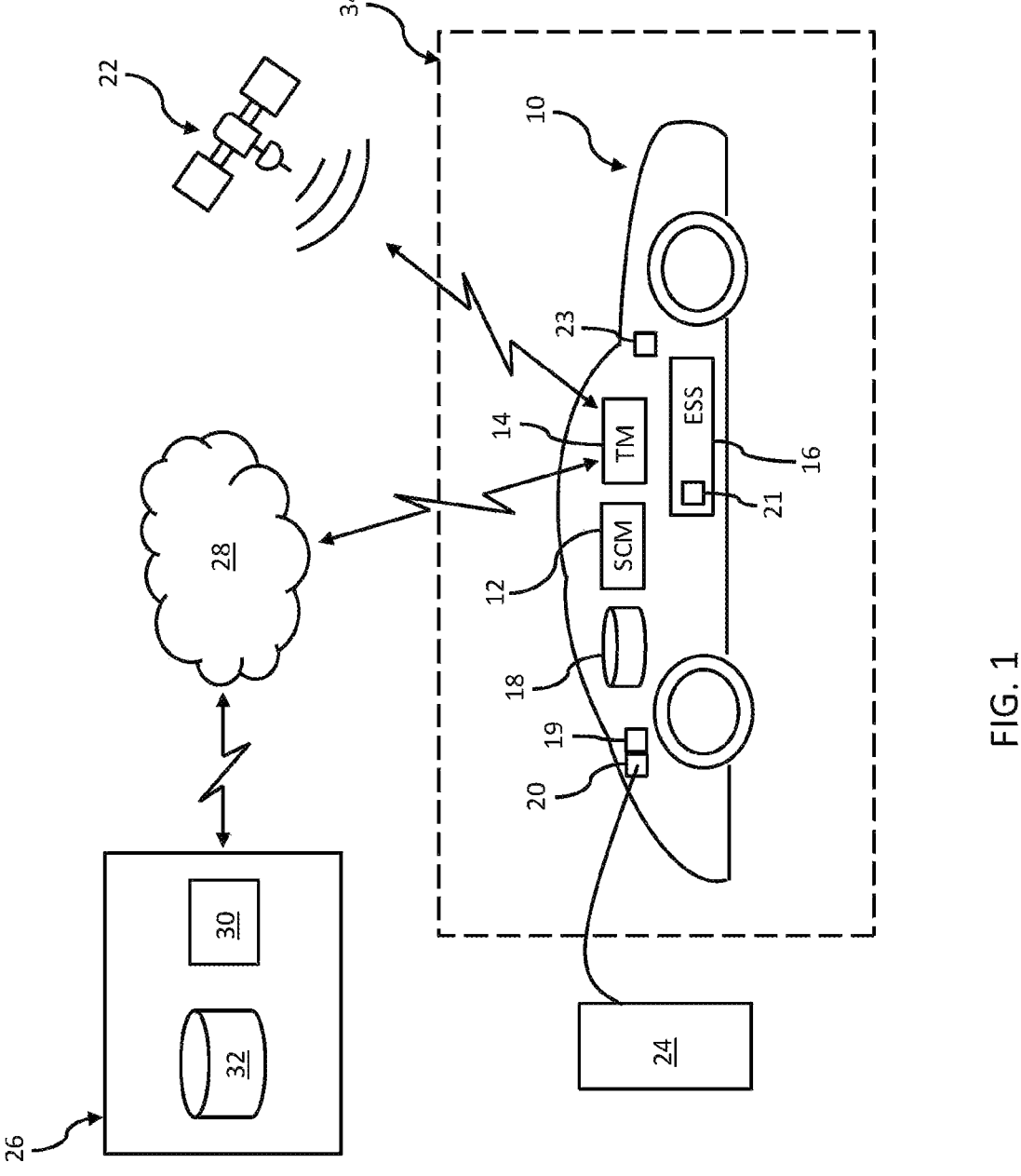
FIG. 1 is conceptual diagram of a system according to one embodiment of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Throughout the present disclosure and in the claims, numeric terminology, such as first and second, may be used in reference to various components or features. Such use is not intended to denote an ordering of the components or features. Rather, numeric terminology is used to assist the reader in identifying the component or features being referenced and should not be narrowly interpreted as providing a specific order of components or features.

Referring now to FIG. 1, a vehicle 10 is shown as including a system control module ("SCM") 12, a telematics module ("TM") 14, an energy storage system ("ESS") 16, an information storage device ("ISD") 18 and a charging port 20. As indicated above, SCM 12 controls various aspects of the operation of vehicle 10. SCM 12 may include a non-transitory memory having instructions that, in response to execution by a processor, cause the processor to determine a status or value of a component or parameter of vehicle 10 based on, for example, input measurements from appropriate sensors. The processor, non-transitory memory and SCM 12 are not particularly limited and can, for example, be physically separate.

In certain embodiments, SCM 12 can form a portion of a processing subsystem including one or more computing devices having memory, processing, and communication hardware. SCM 12 can be a single device or a distributed device, and functions of SCM 12 can be performed by hardware and/or as computer instructions on a non-transient computer readable storage medium, such as the non-transitory memory.

In certain embodiments, SCM 12 includes one or more interpreters, determiners, evaluators, regulators, and/or processors that functionally execute the operations of SCM 12. The description herein including interpreters, determiners, evaluators, regulators, and/or processors emphasizes the structural independence of certain aspects of SCM 12 and illustrates one grouping of operations and responsibilities of SCM 12. Other groupings that execute similar overall operations are understood to be within the scope of the present disclosure. Interpreters, determiners, evaluators, regulators, and processors can be implemented in hardware and/or as computer instructions on a non-transient computer readable storage medium, and can be distributed across various hardware or computer-based components.

Example and non-limiting implementation elements that functionally execute the operations of SCM 12 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret, estimate and/or to determine one or more parameters or data structures. Interpreting, estimating or determining, as utilized herein, includes receiving values by any method known in the art, including at least receiving values from a datalink or network communication, receiving an electronic signal (e.g. a voltage, frequency, current, PWM or pressure signal) indicative of the value, receiving a computer generated parameter indicative of the value, reading the value from a memory location on a non-transient computer readable storage medium such as information storage device 18, receiving the value as a run-time parameter by any means known in the art, and/or by receiving a value by which the interpreted parameter can be calculated, and/or by referencing a default value that is interpreted to be the parameter value.

TM 14 is in wireless communication with a remote computing system 26 via a network 28 and with a remote communications device such as one or more satellites 22. In other embodiments, TM 14 may communicate with satellites 22 via network 28. TM 14 is also in communication with SCM 12 by wired or wireless connection(s) and functions to transmit and receive information between SCM 12, remote computing system 26 and one or more satellites 22. In certain embodiments of the present disclosure, TM 14 and satellites 22 are part of a global positioning system which permits TM 14 (or SCM 12) to determine the location of vehicle 10 with a fairly high degree of accuracy, as is well known in the art. The location of vehicle 10 is used by SCM 12 to determine whether to perform a calibration data port over as is further described below.

ESS 16 may be any of a variety of suitable energy storage systems that are employed to store and provide electrical power to vehicle 10. ESS 16 may include a battery management unit 21, a plurality of battery packs (not shown) and other systems for cooling and sensing operation of ESS 16. In certain applications, ESS 16 may include a plurality of lithium-ion battery packs, although in other applications various other suitable energy storage technologies may be used.

ISD 18 may be any of a variety of suitable information storage devices or systems. ISD 18 may include instructions or code that is executed by SCM 12 to perform functions described herein. ISD 18 may further include data stored in tables, databases, or other formats that are used by SCM 12 and other components of vehicle 10 to control operation of vehicle 10. ISD 18 may, in various applications, include a plurality of memory devices that are in communication with one another and/or with SCM 12. In certain embodiments, ISD 18 stores the calibration data described above and is updated with new calibration data during a port over operation as described in detail below. In certain embodiments, ISD 18 can be part of SCM 12.

In the depicted example, vehicle 10 is an electric vehicle that requires periodic recharging of ESS 16. The recharging is accomplished by connecting charging port 20 to a charging station 24. In various applications, charging station 24 may be located in any of several different locations such as a service station, a parking garage or lot, a commercial vehicle storage location, a truck stop, a personal garage, etc. When charging port 20 is connected to charging station 24, charging station 24 provides electrical energy (such as from the grid or other central storage or generation source) to charging port 20, which is connected to ESS 16 to charge the storage devices of ESS 16. It should be understood that some charging events may be characterized as "opportunistic" charging events, in that they are short duration charging events such as charging vehicle 10 for just a few minutes at a service station while the operator uses other services provided by the service station. In these instances, ESS 16 is not likely to obtain a fully charged status, but a partial charge is nonetheless advantageous. It should be further understood that in many vehicles, ESS 16 cannot be charged during a calibration data port over, an operation which may take several minutes to perform. Thus, in many instances a calibration data port over is not desirable during an opportunistic charging event because too much of the time available for charging would be used for the port over.

Referring back to FIG. 1, vehicle 10, and in particular TM 14, is in communication with remote computing system 26 via network 28. Remote computing system 26 may be a server system or other suitable information management and generation system including one or more processors 30 in communication with one or more memory devices 32 to perform the functions described herein. In certain applications, remote computing system 26 may be operated by a service provider or other entity responsible for maintaining calibration data for vehicle 10. Network 28 may include one or more networks, including any of a Local Area Network, a Metropolitan Area Network, a Wide Area Network, a wireless network and an Inter Network such as the internet. As indicated above, network 28 facilitates communications between remote computing system 26 and TM 14.

In general, the calibration data port over approach of the present disclosure is to provide a port over only when (1) vehicle 10 is connected via charging port 20 to charging station 24, (2) the charging event is complete, and (3) the vehicle is in a predetermined location designated as a safe zone for calibration data updating. In FIG. 1, the predetermined location designated as a safe zone for calibration data updating is depicted by dashed lines 34 and is referred to herein as a geo-fence or geo-fence location. In the present approach, an end customer (e.g., the vehicle operator, fleet owner, original equipment manufacturer, transit authority, etc.) may define one or more geo-fences 34. In certain applications, geo-fence 34 may be a parking lot where buses are charged over night or during periods of non-use. In other applications, geo-fence 34 may be defined as a residential end customer's garage. Any of a variety of different geo-fences 34 may be defined for various different vehicles 10. By only performing a port over when vehicle 10 is in a geo-fence location, a system and method of the present disclosure avoids performing port overs during opportunistic charging events as described above.

Figure 2:
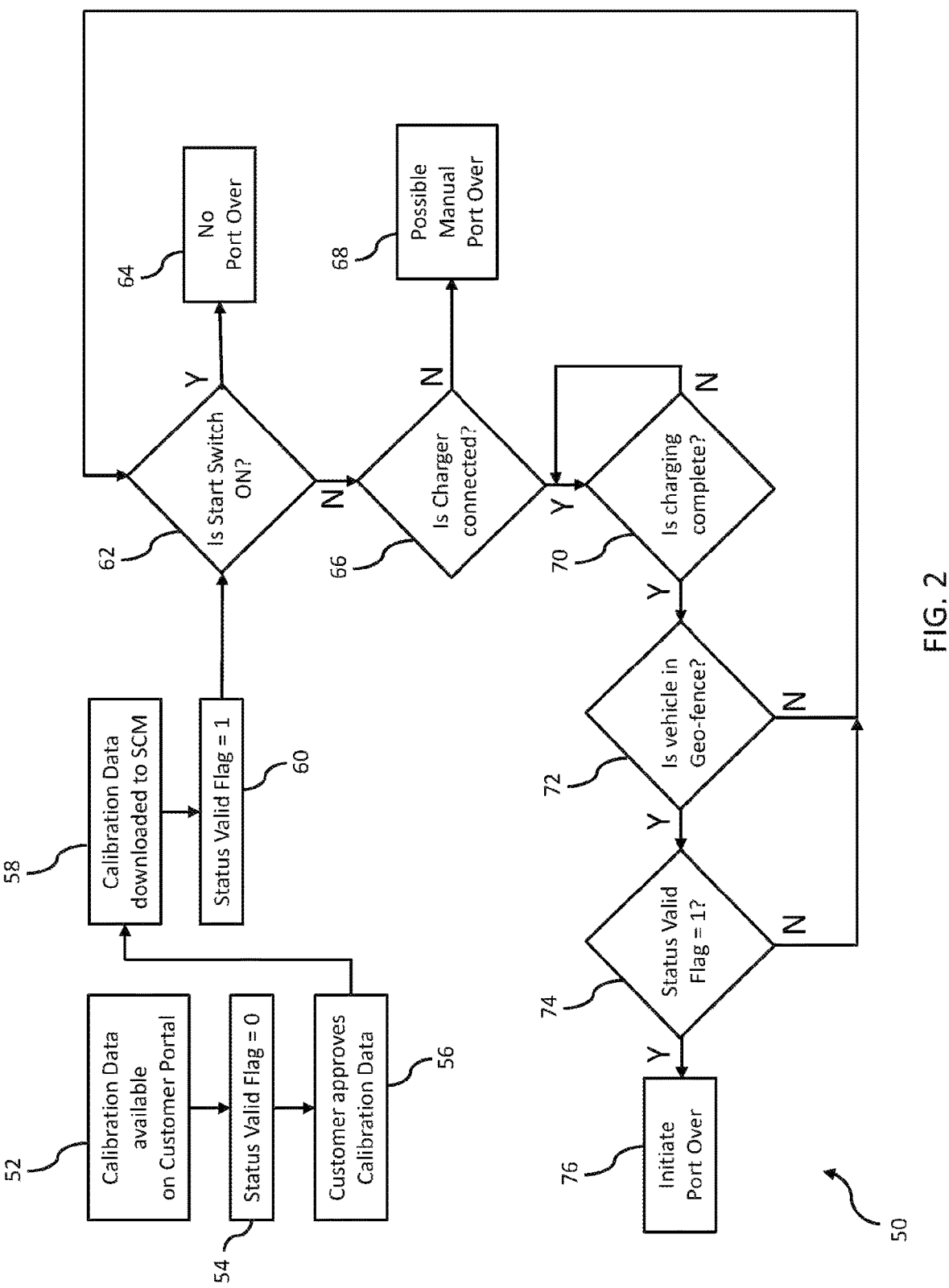
FIG. 2 is a flow diagram of a method of performing a calibration data port over according to one embodiment of the present disclosure.

In operation in certain embodiments, when a customer approves a calibration, calibration data is transferred from remote computing system 26 to TM 14. After the entire set of calibration data is transferred to TM 14, TM 14 transfers a plurality of small packets of calibration data to non-volatile memory in SCM 12. After the entire set of calibration data is available in the memory of SCM 12, a status flag is set to one as depicted in FIG. 2 and described below. SCM 12 then checks the conditions discussed above. Specifically, when charging port 20 is connected to charging station 24, SCM 12 will receive a signal from a sensor (such as sensor 19) or other device indicating that vehicle 10 is connected for a charging event. That satisfies one of the conditions for an automatic port over. SCM 12 can monitor the state-of-charge status of ESS 16 to determine when the charging event is complete or nearly complete. SCM 12 may monitor the ESS 16 state-of-charge status by communicating with, for example, battery management system 21 of ESS 16. SCM 12 can also determine the current location of vehicle 10 from information provided by TM 14. SCM 12 can compare the current location of vehicle 10 to any/all geo-fence 34 locations stored in ISD 18 as being associated with vehicle 10. Alternatively, TM 14 can store the geo-fence 34 locations and make the determination of whether vehicle 10 is in a geo-fence 34 location based on the current location of vehicle 10. In any event, if the vehicle 10 is located within a geo-fence 34, and if vehicle 10 is connected to charging station 24 and the charging event is complete or nearly complete, then SCM 12 conducts the calibration data port over. In this manner, the downloading of calibration data via network 28 to TM 14 and the non-volatile memory of SCM 12 occurs in advance of the port over of the calibration data, which is not performed unless the conditions described above are all satisfied.

Referring now to FIG. 2, a method 50 of performing a calibration data port over according to the present disclosure is depicted. Initially, at block 52, remote computing system 26 determines that calibration data is available for downloading to vehicle 10. As indicated above, remote computing system 26 may make this determination for any of a variety of reasons when updated data/instructions may be needed for improved performance of vehicle 10. When the determination is made that updated calibration data is available, remote computing system 26 sets a status valid flag to zero at block 54. At step 56, the customer, such as a vehicle fleet owner, approves the transfer of the calibration data via network 28 to TM 14 and the non-volatile memory of SCM 12. At block 58, remote computing system 26 downloads the updated calibration data via network 28 in the manner described herein and SCM 12 sets the status flag to one at block 60.

At this point in the process, the calibration data has been received by SCM 12 of vehicle 10 but the port over operation has not been executed wherein the calibration data is moved to ISD 18, a process which interrupts the normal operation of SCM 12. At block 62, SCM 12 determines whether a vehicle start switch 23 is in the ON position. If start switch 23 is ON, indicating that vehicle 10 is in use or about to be used, then no port over occurs as is indicated by block 64. If start switch 23 is not in the ON position, then SCM 12 determines at block 66 whether charging port 20 is connected to charging station 24 in the manner described herein. If charging port 20 is not connected to charging station 24, then an automatic port over will not occur but under certain circumstances outside the scope of the present disclosure a manual port over may occur as indicated by block 68. If charging port 20 is connected to charging station 24, then one of the conditions for an automatic port over of updated calibration data is satisfied.

Vehicle 10 may be in the process of receiving a charge from charging station 24 when the present method reaches block 70, but the charging event may not be complete. SCM 12 remains at block 70 monitoring the state-of-charge of ESS 16 until SCM 12 determines that the charging event is complete or nearly complete. Charging is complete when the state-of-charge ("SOC") of ESS 16 is at 100%. Charging is nearly complete when the SOC of ESS 16 is at or above a bulk charge threshold which is a calibration parameter that the customer can set. The criteria that sets charging as complete for the purpose of port over is SOC>=bulk charge threshold (default value is 100) and charging time is greater than a time threshold (e.g., 30 minutes).

When the charging event is complete or nearly complete, SCM 12 determines at block 72 whether vehicle 10 is in a predesignated geo-fence 34 where a port over may be safely performed. As indicated above, SCM 12 in communication with TM 14 determines the actual location of vehicle 10 (e.g., using GPS technology) and compares the actual location to any predetermined geo-fence 34 locations. If vehicle 10 is not in a geo-fence 34, then the method returns to block 62 and SCM 12 determines whether start switch 23 is in the ON position. If, on the other hand, vehicle 10 is in a geo-fence 34, then SCM 12 determines at step 74 whether the status valid flag is set to one, which in this example it is as described with reference to block 60. At this point, all conditions for an automatic port over of updated calibration data are met, and SCM 12 initiates a port over process at block 76.

It should be understood that the various conditions for an automatic port over process may be checked in a different order than that depicted in FIG. 2. For example, the first condition check may be whether vehicle 10 is in a geo-fence 34, and if not, the remainder of the checks may be skipped. Other alternative sequences may be used within the scope of the present disclosure.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

We claim:

1. A system for automatically performing a calibration data port over process for a vehicle, comprising:

a system controller mounted to the vehicle and in communication with an information storage device configured to store calibration data;

telematics mounted to the vehicle and in communication with the system controller; the telematics being configured to communicate wirelessly with a remote communication device to receive data indicating a current geographic location of the vehicle and with a remote computing system to receive calibration data; and a charging port mounted to the vehicle and configured to connect to a charging station to receive electrical energy during a charging event for charging an energy storage system mounted to the vehicle;

wherein the remote computing system is configured to generate and transmit updated calibration data to the telematics for use in a port over process to replace and/or add to the calibration data stored on the information storage device; and wherein the system controller is configured to receive the updated calibration data from the telematics and initiate an automatic port over process to at least one of replace or add to the calibration data stored on the information storage device with the updated calibration data in response to a multifactor preinitiation process that includes determining (1) that the charging port is connected to the charging station, (2) that the charging event is complete by evaluating whether a duration of the charging event exceeds a predefined threshold indicative of at least one of a non-opportunistic and a prolonged charging event, and (3) that the current geographic location of the vehicle is within a predetermined geo-fence location determined based on GPS data received via the telematics, wherein absent satisfaction of the multifactor preinitiation process the system controller refrains from initiating the automatic port over process, wherein the system controller is configured to receive the updated calibration data from the telematics and initiate an automatic port over process to at least one of replace or add to the calibration data stored on the information storage device with the updated calibration data in response to a multifactor preinitiation process that includes determining (1) that the charging port is connected to the charging station, (2) that the charging event is complete by evaluating whether a duration of the charging event exceeds a predefined threshold indicative of at least one of a non-opportunistic charging event and a prolonged charging event, and (3) that the current geographic location of the vehicle is within a predetermined geo-fence location determined based on GPS data received via the telematics, wherein absent satisfaction of the multifactor preinitiation process the system controller refrains from initiating the automatic port over process.

2. The system of claim 1, wherein the system controller is configured to determine whether a vehicle start switch is in an ON position, and to prevent the automatic port over process in response to the vehicle start switch being in the ON position.

3. The system of claim 1, wherein the system controller determines that the charging port is connected to the charging station by receiving a signal from a sensor configured to detect a connection between the charging port and the charging station.

4. The system of claim 1, wherein the system controller determines that the charging event is complete by monitoring a state-of-charge of the energy storage system.

5. The system of claim 4, wherein the system controller determines that the charging event is complete when the state-of-charge of the energy storage system equals or exceeds a predetermined threshold.

6. The system of claim 1, wherein the system controller determines that the current geographic location of the vehicle is within a predetermined geo-fence location by comparing the current geographic location of the vehicle to data stored in the information storage device indicating one or more predetermined geographic locations defined as being safe locations for an automatic port over process.

7. The system of claim 6, wherein the one or more predetermined geo-fence locations are defined by an end customer of the vehicle.

8. The system of claim 1, wherein the system controller determines that the current geographic location of the vehicle is within a predetermined geo-fence location by receiving an indication from the telematics that the vehicle is in a predetermined geo-fence location.

9. The system of claim 1, wherein the multifactor preinitiation process is executed autonomously by the system controller in response to system-detected conditions and independent of operator input or manual confirmation.

10. An electric vehicle, comprising:
a system controller;
an information storage device configured to store calibration data used by the system controller during operation of the vehicle;
a rechargeable energy storage system including a plurality of battery packs configured to provide power to components of the vehicle;
a charging port configured to connect to a charging station to receive electrical energy to charge the energy storage system during a charging event;
wherein the system controller is configured to receive calibration data updates from a remote computing system over a network and to initiate an automatic port over process to at least one of replace or add to calibration data stored on the information storage device with the calibration data updates in response to a multifactor preinitiation process that includes determining (1) that the charging port is connected to the charging station, (2) that the charging event is complete by evaluating whether a duration of the charging event exceeds a predefined threshold indicative of both a non-opportunistic charging event and a prolonged charging event, and (3) that a current geographic location of the vehicle is within a predetermined geo-fence location based on satellite-based positioning data, wherein absent satisfaction of the multifactor preinitiation process the system controller refrains from automatically initiating the automatic port over process.

11. The electric vehicle of claim 10, further comprising telematics in communication with the system controller and configured to communicate wirelessly with a remote communication device to receive data indicating the current geographic location of the vehicle and with the remote computing system to receive the calibration data updates.

12. The electric vehicle of claim 11, wherein the system controller determines that the current geographic location of the vehicle is within a predetermined geo-fence location by receiving an indication from the telematics that the vehicle is in a predetermined geo-fence location.

13. The electric vehicle of claim 10, wherein the system controller is configured to determine whether a vehicle start switch is in an ON position, and to prevent the automatic port over process in response to the vehicle start switch being in the ON position.

14. The electric vehicle of claim 10, wherein the system controller determines that the charging port is connected to the charging station by receiving a signal from a sensor configured to detect a connection between the charging port and the charging station.

15. The electric vehicle of claim 10, wherein the system controller determines that the charging event is complete by monitoring a state-of-charge of the energy storage system.

16. The electric vehicle of claim 15, wherein the system controller determines that the charging event is complete when the state-of-charge of the energy storage system equals or exceeds a predetermined threshold.

17. The electric vehicle of claim 10, wherein the system controller determines that the current geographic location of the vehicle is within a predetermined geo-fence location by comparing the current geographic location of the vehicle to data stored in the information storage device indicating one or more predetermined geographic locations defined as being safe locations for an automatic port over process.

18. A method for performing an automatic port over process to modify calibration data of an electric vehicle with updated calibration data, the method comprising:
obtaining the updated calibration data from a remote computing system; and
performing the automatic port over process in response to satisfaction of a multifactor preinitiation process that includes (1) a charging port of the electric vehicle being connected to a charging station, (2) a duration of a charging event of the electric vehicle being indicative of a state-of-charge of an energy storage system of the electric vehicle has reached or exceeded a predefined threshold and that a minimum charging time has elapsed, and (3) a current geographical position of the electric vehicle being located within a predetermined geo-fence location based on telematics-derived positioning data.

19. The method of claim 18, wherein further comprising at least one of:
receiving a signal from a sensor configured to detect connection between the charging port and the charging station;
monitoring a state-of-charge of the energy storage system; and
communicating with a remote communication device to receive data indicating a current geographic location of the vehicle and comparing the current geographic location to data stored in an information storage device of the vehicle indicating one or more predetermined geographic locations defined as being safe locations for an automatic port over process.

20. The method of claim 18, further comprising determining whether a vehicle start switch is in an ON position, and preventing the automatic port over process in response to the vehicle start switch being in the ON position.

21. The method of claim 18, wherein the multifactor preinitiation process further includes determining that the vehicle has remained within the predetermined geo-fence location for a continuous duration exceeding a predetermined minimum dwell time.

22. The method of claim 18, wherein the automatic port over process is deferred when the vehicle is within the predetermined geo-fence location but the charging event is classified as an opportunistic charging event.

* * * * *